Willard and Ross,
Mower.
No. 1776 Reissued Sept. 27. 1864.
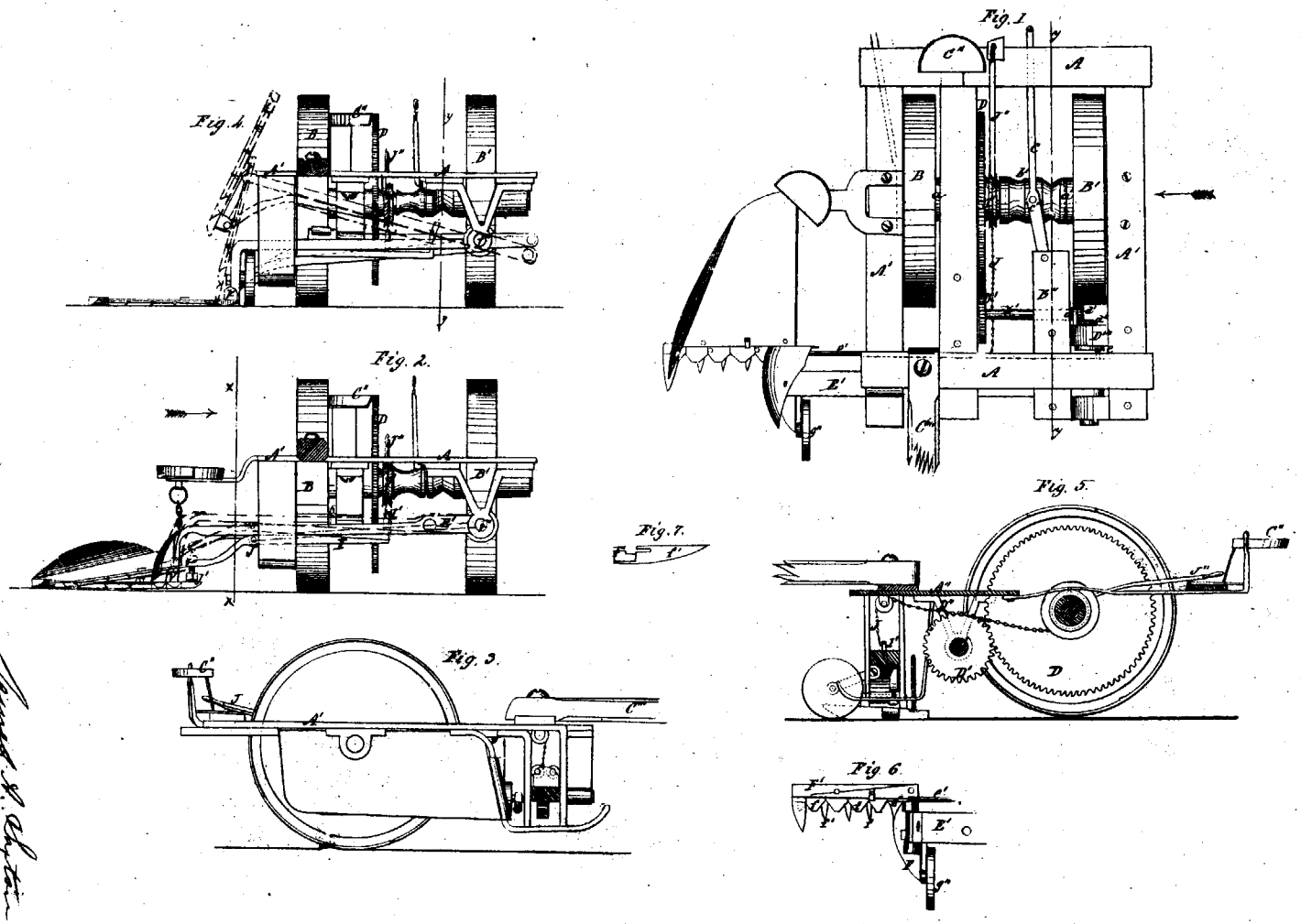
Witnesses: J. Henry Hill
Elijah S. Dodge
James A. Shipton
By his Attorney
Thos. H. Dodge

UNITED STATES PATENT OFFICE.

JAMES A. SAXTON, OF CANTON, OHIO, ASSIGNEE, BY MESNE ASSIGNMENTS, OF HOSEA WILLARD AND ROBT. ROSS.

IMPROVEMENT IN HARVESTERS.

Specification forming part of Letters Patent No. 18,562, dated November 3, 1857; Reissue No. 1,776, dated September 27, 1864.

*To all whom it may concern:*

Be it known that HOSEA WILLARD, of Vergennes, in the county of Addison and State of Vermont, and ROBERT ROSS, formerly of same place, but now residing at Saint Albans, in the county of Franklin, in said State, invented certain new and useful Improvements in Grain and Grass Harvesting Machines, of which the following is a full, clear, and exact description, reference being had to the accompanying drawings, forming part of this specification, and in which—

Figure 1 is a plan or top view showing one mode of applying said improvements when the machine is to be used as a reaper. Fig. 2 represents a front view of Fig. 1 with the leading-wheel removed to show the parts in rear of it more fully, the coupling-arm, finger-beam, and platform being shown in different positions to illustrate the flexible connection of the finger-beam with the machine. Fig. 3 represents a section and side view on line *x x*, Fig. 2, when the parts are in position as shown in black lines. Fig. 4 represents in black lines a front view of the machine when arranged for mowing and in blue and red lines two of the different positions which the finger-beam and cutting apparatus are made to assume when being prepared or folded for transportation. Fig. 5 represents a section on lines *y y*, Figs. 1 and 4, when the machine is arranged for mowing, as shown in black lines, Fig. 4. Fig. 6 represents a plan or top view of finger bar or beam, F′, shoe F, leading-wheel *g″*, and part of the coupling-arm or finger-bar extension-piece E′; and Fig. 7 represents a side view of one of the fingers and an end or cross-section of the finger bar or beam, showing how a part of the finger is made to rise up by the front edge of the bar to keep the cutter-bar from working forward.

The side of the machine which runs next to the standing grain I call the "inside" and that which runs next to the cut grain the "outside."

In the accompanying drawings the main frame, which is of rectangular form, is represented by the letters A A A′ A′. To the under side of the parts A′ A′ are fastened the bearings of the main shaft or journal of the driving and supporting wheels B B′. To the inner hub of the latter is fastened a ratchet wheel or device, *a′*, while a similar ratchet device, *a*, is fastened to the outer hub or side of wheel B. Wheels B B′, with their hub-ratchets, are fitted loosely on shaft X. A sliding ratchet wheel or device, *b′*, works on shaft X, and is so connected therewith as to be revolved when said shaft revolves, but is susceptible of a lateral movement, so that it can be moved in and out of action with ratchet *a′* by means of pin *c′* in lever *c*, whose front end is pivoted to the under side of piece B″, fastened to the front of the frame. Pin *c* fits into a groove turned in the part *b′*, so that the said part *b′* operates like a sliding revolving clutch. A similar ratchet or clutch, *b*, is fitted to be worked by lever C′ on the outside of wheel B.

C″ is the driver's seat, which is fastened to the rear of the main frame, and in such a position as that levers C and C′ are both within his reach.

As the machine is drawn forward by tongue C″, (shown in section,) wheels B B′ revolve, and when both or either of the clutches *b b′* are in action with their respective ratchets *a a′* shaft X is caused to revolve, together with cog-wheel D, fastened thereto, and which gears into cog-wheel D′ on a shaft, X′, supported at one end by a hanger, D″, depending from piece A″, and at the other in a projection, *d*, from hanger D‴, in which a short crank-shaft turns, the latter having on its rear end a bevel-gear, *d″*, which is operated by bevel-gear *d′* on the end of shaft X′.

On the front of the crank-shaft is fitted a balance-wheel, *e*, with a crank-pin upon which is placed the outer end of the pitman *e′*, which gives motion to the cutter-bar *e″*, to which are attached teeth *f*, which work as they vibrate through slotted open fingers *f′*.

The class of mowing-machines which are provided with a finger-beam so hinged or connected to the main frame as that while free to rest on the ground they are also free to rise or fall bodily or at either end independent of the other present many advantages, pre-eminent among which may be mentioned the close, even, uniform cut of stubble, and that, too, on uneven ground. This class of machines, however, as heretofore constructed, have not had sufficient provision made for raising the loose finger-beam off of the ground in an expeditious manner to avoid stumps, stones, or other similar obstacles in the path of the machine.

To remedy this defect is the object of the invention which is claimed under this patent, and which consists, first, in combining a knuckle with the joint which connects the finger-beam and coupling-arm in such a manner that when the coupling-arm is raised said knuckle will prevent the outer end of the finger-beam from falling below a certain level, thus enabling the entire finger-beam to be raised in nearly a horizontal position whenever the coupling-arm is raised; second, in combining a knuckle and set-screw or adjusting-bolt or its equivalent with the joint which connects the heel of the finger-beam with the coupling-arm in such a manner that by turning said screw or bolt the horizontal position of the finger-beam, when it is raised, can be varied, or in other words, whereby the distance or extent which the heel of the finger-beam can rise before the outer end is elevated can be varied at the will of the operator; third, in the combination of a lever with the coupling-arm and heel of the finger-beam, whereby when the machine is in operation the finger-beam is left free to rise or fall at either end, yet can be raised or elevated as readily in nearly a horizontal position by power applied to the coupling-arm as if the finger-beam were fastened rigidly to the end of the coupling-arm instead of being connected thereto by a joint.

It is not now deemed necessary to describe the mowing-machine represented in the drawings further than is necessary to illustrate the invention which forms the subject-matter of this patent, since it is fully described in other divisions of even date herewith. The finger-beam is hinged at its heel end, or the shoe to which its heel end is attached, to the end of a coupling-arm, which in turn is connected by a hinge and bracket or hanger to the main frame.

From the heel end of the finger-beam, and on a line between the lugs which sustain the hinge-pin *v*, a knuckle or finger projects beneath the coupling-arm, so that when the coupling-arm and heel end of the finger-beam are raised to a certain height the knuckle will strike against a set-bolt, $j^2$, as shown in black lines, Fig. 2, and consequently any further raising of the coupling-arm will be attended by a similar rising of the finger-beam, as if the two were rigidly connected instead of by a hinge or joint.

If the knuckle came directly in contact with the coupling itself, the distance at which the heel end of the finger-beam could rise above its outer end, or vice versa would necessarily be limited, provided the finger-beam were so arranged as to be raised in a position approaching a horizontal line, in passing over obstructions. To obviate this difficulty, a lever or arm, I, is pivoted to the under side of coupling-arm E′, at *j*, one end being bent or curved down, and provided with a set screw or bolt, *j′*, while the other end has uprights I′ I′, which pass up through holes in the coupling-arm E′, and to one of which the lifting cord or chain J is to be attached. If used as a reaper, the upright next to the joint *f″* is used, while if used as a mower the other is used, the former being shown in Fig. 2, the latter in Fig. 4. By this arrangement, so long as the chain or cord J is loose the heel end of the finger-beam can rise or be deflected upward to any desired height while the outer end is resting su the ground, one position being shown in red lines, Fig. 2. Consequently the finger-beam or either end can freely conform to the uneven surface of the ground when the machine is in operation. Should an obstruction now intervene—such as a stone or stump—the driver takes hold of lever J″, fastened to pulley J′, loose on axle X, and to which chain J is fastened, and raises it up, thus causing chain J to be wound upon pulley J′, whereby the outer end of lever or arm I is raised up against coupling-arm E′, while the other end is thrown down to act against the knuckle, and render the joint stiff, so that as the coupling-arm is raised the finger-beam is raised in nearly a horizontal position, as shown in black lines, Fig. 2. By interposing a set or adjusting screw or bolt between the knuckle and coupling-arm any desired inclination or position as respects the ground can be given the finger-beam when raised. It will thus be seen that the finger-beam or either end has perfect freedom to conform to the inequalities in the ground when in operation, while at the same time the construction is such that the entire loose finger-beam can be raised with a prompt and positive motion to pass over obstructions.

One practical mode of applying said improvements to use having been described, what is claimed under this patent as the invention of said WILLARD and ROSS is—

1. The combination of a knuckle or the equivalent thereof with the joint which connects the finger-beam and coupling-arm for raising the hinged finger-beam of a mowing-machine off of the ground to pass obstructions.

2. The combination of a lever with a hinged finger-beam and coupling-arm, as herein described, in such a manner that while the finger-beam or either end is free to conform to the inequalities of the ground while in operation the finger-beam can be raised or elevated to pass over obstructions, as set forth, by simply raising the coupling-arm, substantially as described.

3. The combination, with the joint which connects the finger-beam and coupling-arm, of a knuckle and adjusting screw or bolt or their equivalents for regulating the upward deflection of the heel end of the finger-beam.

In testimony whereof I have hereunto subscribed my name.

JAMES A. SAXTON.

In presence of—
GEO. E. BALDWIN,
S. SURBURG.